E. K. HAYNES.
Lamp.
No. 91,933.
Patented June 29, 1869.
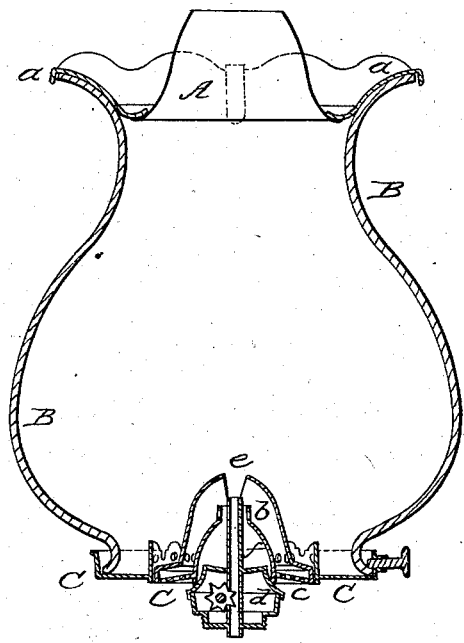
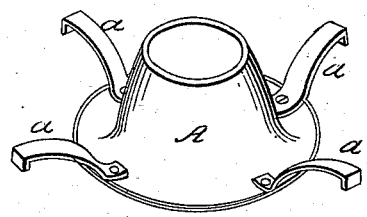
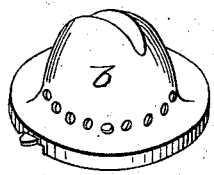
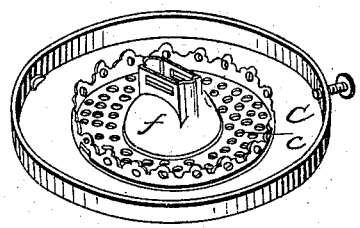
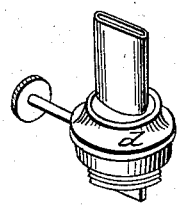
Witnesses
Inventor:
E. K. Haynes
by his attorney

United States Patent Office.

EDGAR K. HAYNES, OF BOSTON, MASSACHUSETTS, ASSIGNOR TO WILLIAM CARLETON, OF SAME PLACE.

Letters Patent No. 91,933, dated June 29, 1869.

IMPROVEMENT IN LAMPS.

The Schedule referred to in these Letters Patent and making part of the same.

*To all whom it may concern:*

Be it known that I, EDGAR K. HAYNES, of Boston, in the county of Suffolk, and State of Massachusetts, have invented certain new and useful Improvements in Lamps; and I hereby declare the following to be a full, clear, and exact description of the same, reference being had to the accompanying drawing, in which—

Figure 1 is a vertical central section through a lamp-burner, with my improvements applied.

Figures 2, 3, 4, and 5 are views of detached parts.

The object of my invention is primarily to adapt a lamp-burner to be used with a globe alone and without a chimney.

The advantage resulting from such an arrangement will be readily appreciated, for the frequent breaking of lamp-chimneys is a source of unceasing annoyance and inconvenience. In order, however, to adapt the globe for this purpose, its upper end must be contracted, so as to produce the necessary draught, and prevent the air from above entering the space enclosed by the globe. To draw in or contract to any extent the glass mouth of the globe, would render it, however, equally if not more liable than the chimney, by reason of the unequal heating, to be cracked and broken. It is therefore necessary to combine with the globe a distinct and separate device for contracting the opening and producing the draught, which can at the same time be readily adjusted upon or removed from the globe.

In combining this device, which may be called a draught-nozzle, with the globe, there are, however, further requirements and needs to be provided for. If, for instance, the adjustable or removable draught-nozzle were located outside of and above the globe, the two together would constitute little more than an ordinary glass and metal chimney, while the draught-nozzle would be liable, unless fixed or fastened tightly in position, to be shaken from its place by the slightest jar, and consequently would require frequent re-adjustment. The further object I have in view, therefore, is to so combine the two parts, that the globe shall at all times retain its distinctive character as a globe, and that the draught-nozzle, although adjustable and easily removable, shall be entirely protected or shielded, and retained securely in place when applied to the globe, without the employment of any accessory device for fastening and holding it.

The adjustable or removable draught-nozzle is fully shown at A in figs. 1 and 3. It has a bell or conical shape, or may have any other suitable form, gradually contracting toward its upper end so as to cause the required draught when the lamp is burning. Its base or lower part is made broad, so as to be dropped and to fit snugly within the mouth of the globe B, where it is held by supporting-hooks, or arms *a*, which catch over the upper edge of the globe. These arms are of sheet metal, and can be bent so as to conform to the shape and size of the globe.

When the globe and its draught top-piece are thus substituted for the chimney, it has been found that if any appreciable quantity of air be allowed to pass up through the globe-rest, the flame flickers and does not burn with the required brilliancy and steadiness; and to remedy this defect, I employ an imperforate globe-rest, so that all the air required to feed the flame shall pass up to the same, not through the globe-rest, but through the burner.

The globe-rest is represented at C, figs. 1 and 2. It consists of an imperforate annular ring, flanged and provided with the usual catches and holding-devices for securing the globe in place, surrounding and solidly united with the body of the burner.

This globe-rest may be applied to a burner such as represented in the drawing, or of any ordinary or suitable construction, in the manner shown, so that when the globe is in position, all the air passes to the flame through the base of the burner and deflector, and none, that is to say, no appreciable amount, through the globe-rest, or between the same and the base of the globe.

When the parts are thus arranged and applied together, the flame will give a very brilliant and uniform light.

I have found that my invention is also applicable to lamp-burners in which the upper section, consisting of the deflector, draught-plate and appurtenances, are adjustable upon and removable from the base or lower section, and to this end I combine the imperforate globe-rest with a removable sleeve, fitting or supported upon the lower part of the burner, so that the globe-rest, together with the parts which it carries, may be readily detached from or adjusted to the burner.

The manner in which this result is attained will at once be understood by reference to figs. 1, 2, 4, 5.

The deflector *b* and draught-plate *c* are made adjustable upon or removable from the base *d* and wick-tube *e* by the sleeve *f*, or other means usually employed for the purpose.

The imperforate annular globe-rest C is brazed, riveted, or otherwise suitably attached to the periphery of the draught-plate, which it closely fits and surrounds, and the globe-rest, deflector, and draught-plate can thus be bodily removed from or adjusted upon the wick-tube. All the air required to feed the flame passes up through the draught-plate *c* and deflector *b*.

Having now described my invention, and the manner in which the same is or may be carried into effect,

What I claim, and desire to secure by Letters Patent, is—

1. The combination, with a lamp-burner of otherwise ordinary or suitable construction, but in which the globe and its draught-nozzle are employed in lieu of the chimney, of an imperforate globe-rest, under such an arrangement that all the air required for the flame shall pass to the same through the burner, and not through said globe-rest, as and for the purposes set forth.

2. The mode of suspending the draught-nozzle wholly or partly within the globe, by means of hooked arms which catch over the upper end or mouth of the globe, substantially as shown and set forth.

3. The combination of the imperforate globe-rest, arranged so that the air required to feed the flame shall pass through the burner, as before specified, and carrying the globe and draught-nozzle employed in lieu of the chimney, with a removable sleeve fitting or supported upon the lower part of the burner, under the arrangement and for operation as set forth.

In testimony whereof, I have signed my name to this specification, before two subscribing witnesses.

EDGAR K. HAYNES.

Witnesses:
   CHAS. B. F. ADAMS,
   JEROME S. MACDONALD.